United States Patent [19]
Lindoerfer et al.

[11] Patent Number: 5,128,262
[45] Date of Patent: Jul. 7, 1992

[54] MICROBIAL DECONTAMINATION OF SOILS CONTAMINATED WITH HYDROCARBONS, IN PARTICULAR MINERAL OILS BY MICROBIAL OXIDATION

[75] Inventors: Walter Lindoerfer, Kassel; Kai-Udo Sewe, Barnstorf; Axel Oberbremer, Cremlingen; Reinhard Mueller-Hurtig, Braunschweig; Fritz Wagner, Braunschweig-Stoeckheim, all of Fed. Rep. of Germany

[73] Assignee: Wintershell AG, Kessel, Fed. Rep. of Germany

[21] Appl. No.: 251,450

[22] Filed: Sep. 30, 1988

[30] Foreign Application Priority Data

Oct. 2, 1987 [DE] Fed. Rep. of Germany ....... 3733341

[51] Int. Cl.$^5$ .............................................. C10G 32/00
[52] U.S. Cl. .................................. 435/264; 435/262; 435/281; 435/74; 435/100; 435/101; 435/105; 435/248; 435/249; 435/244; 435/170; 536/18.2; 536/4.1
[58] Field of Search .............. 252/8.554; 208/3, 262.1; 210/611, 617, 618, 908, 909, 922; 166/246, 270, 275, 276, 274; 536/1.1, 18.2, 115, 119, 120, 127, 4.1; 435/74, 84, 243, 101, 148, 155, 142, 146, 248, 249, 281, 170, 244, 100, 105

[56] References Cited

U.S. PATENT DOCUMENTS

| 4,146,470 | 3/1979 | Mohan et al. | 435/249 |
| 4,349,633 | 9/1982 | Worne et al. | 435/281 |
| 4,401,569 | 8/1983 | Jhaveri et al. | 435/281 |
| 4,522,261 | 6/1985 | McInerney et al. | 435/281 |
| 4,765,902 | 8/1988 | Ely et al. | 435/246 |
| 4,814,272 | 3/1989 | Wagner et al. | 435/74 |

OTHER PUBLICATIONS

Wagner et al., European Congress in Biotechnology (3rd: 1984: Munich, Germany), 10–14, Sep. 1984.

Primary Examiner—Ronald W. Griffin
Assistant Examiner—Pamela S. Webber
Attorney, Agent, or Firm—Keil & Weinkauf

[57] ABSTRACT

The microbial decontamination of soils contaminated with hydrocarbons, in particular with mineral oils, by microbial oxidation is improved by a process in which in addition to supplying the oxygen necessary for degradation, by aeration, soluble nutrients, water and soluble or dispersed biosurfactants as such or mixed with chemical surfactants are metered into the contaminated soils directly or into the removed contaminated soil layers, in one or more batches at time intervals, in an amount such that the formation of toxic intermediates which slow down or block microbial degradation in prevented, the accessibility of mineral oils and their products for the microorganisms is simultaneously increased and, as a result, accelerated, virtually complete mineralization by respiration to $CO_2$ and $H_2O$ is effected.

18 Claims, No Drawings

MICROBIAL DECONTAMINATION OF SOILS CONTAMINATED WITH HYDROCARBONS, IN PARTICULAR MINERAL OILS BY MICROBIAL OXIDATION

The present invention relates to a process for improving the microbial decontamination of soils contaminated with hydrocarbons, in particular with mineral oils, by microbial oxidation.

Because the world population and the associated industrialization are increasing, environmental protection is of worldwide, primary importance.

This includes the decontamination of soils contaminated with hydrocarbons, in particular with mineral oils, in the environment of oil-producing and -processing plants, or from oil accidents during transportation of, for example, crude oil and light oil, as a result of leaks from oil pipelines, storage tanks and containers, or from accidents. These include oil contamination of coasts and beaches and mud flats through the discharge of oil residues into the sea, which are brought to land by flood and wind and mixed there with the soils.

An industrial process is described in Wasser, Luft und Betrieb, wlb., IFAT Report 87. Contaminated soils are supposed to be decontaminated without the addition of chemicals by means of a mechanical high pressure soil wash in a container by a procedure in which oil adhering to the surface of the soil particles is forced off by the pressure jet.

This process is only suitable for partial removal. A residual amount of mineral oil remains adhering in the capillaries. This residual amount must then be removed in a further process by agitating the soil again. Furthermore, some of the mineral oil is emulsified or mixed and has to be removed by settling out of the pressurized water in a settling tank. Thus, the pressurized water also has to be worked up.

It is understandable that the specialists have turned to other methods for disposing of soils contaminated with mineral oils.

Another technological process uses specially cultivated microorganisms called Noggies for the biological decontamination of contaminated soils. Such microbial organisms are said to consist of a combination of aerobic and anaerobic adapted bacteria mutants. These are freeze-dried and fixed to substrates. This procedure has been published in Umwelt 4/86, 293.

In this prior art, the contaminated surface is cut through and the mass with nutrients and surfactants is applied in the form of an aqueous solution to the contaminated soil. After 6 weeks, the oil concentration in the soil is said to be reduced by about 66%.

Umweltmagazin, May 1986 describes the use of special microorganisms which populate pine bark. These microorganisms should therefore be particularly suitable for the respiration of mineral oil in soils contaminated therewith, because the pine bark resins present therein are processed as a carbon source. These resins are said to contain compounds which are also present in mineral oil.

In this procedure, a mixture of contaminated soil and pine bark must first be prepared. This mixture is then applied in the form of a layer to a foil. Respiration of the mineral oil is said to be effected by oxygen dissolved in rainwater.

This procedure too requires a fairly long time before the mineral oil has been degraded. Furthermore, it is necessary to seal off the layer of mixture from the subsoil and to collect seepage water separately.

Another prior art process is published in Diversified Techn. Belgium, SA. It is proposed that Pseudomonas putida, as bacteria which oxidize oil hydrocarbons, be injected into the contaminated soil by means of compressed air, in the form of a dry powder mixed with mineral salts. The growth and the progress of the oil oxidation are to be determined by constant sampling.

This procedure leads in practice to a non-uniform distribution in the soil. The rate of oil degradation depends on the irregular supply of water and air and is thus difficult to control.

Another industrial process, the IAT Biosystem earth, entails optimizing the living conditions of the microorganisms in the soil, so that the degradation of hydrocarbons should be complete in the course of from 12 to 24 months.

The substrates used are:

Bio-Terra C, consisting of a natural organic substrate with adapted microorganisms.

Bio-Borke G, consisting of bark with adapted microorganisms.

Both substrates are commercial products of Umweltschutz-Nord GmbH, Bremen. Known microorganisms are to be used. The contaminated soils are to be disposed of by removing them and mixing them with the substrates, after which they are stored on storage areas for about two years. The surface water is supposed to penetrate the biodegradation bed uniformly. This prior art procedure too requires a long period for the oxidative, microbial degradation of mineral oils.

In Umweltschutz, February 1986, 90–93, R. Rüdiger makes the following statement: Up to the present time, there is no known procedure which permits the microbial degradation of hydrocarbons over a large area underground in realistic times.

The process of the invention starts from the prior art described.

The elimination of oil-contaminated waters and soils is also described in patents.

German Laid-Open Application DOS 2,422,231 discloses a process for protection from oil contamination with the aid of microorganisms.

In this process, beaches and surfaces are to be treated with an aqueous suspension of microorganisms consisting of Arthrobacter, Micrococcus and Achromobacter, by spraying. This proposal too does not go beyond the known, technological prior art and cannot lead to reliable and complete microbial treatment of beaches and soils contaminated by mineral oils.

German Laid-Open Application DOS 2,533,775 discloses a process for eliminating open and latent oil contaminations. In this procedure, oxygen in the form of liquid $O_2$ carriers, such as $H_2O_2$, is to be fed to the contaminated material to achieve accelerated degradation of mineral oils underground and on beaches. Surfactants and nutrient salts are also to be added to this liquid oxygen carrier.

This proposal has the disadvantage that damage to the bacteria population due to a toxic effect cannot be ruled out when active oxygen in the form of peroxides is used. This leads to substantial inhibition of the respiration of the mineral oil. Moreover, the unstable solution practically decomposes under the catalytic action of soil colloids and is therefore available in the soil only for a short time.

German Laid-Open Application DOS 2,739,428 is also concerned with acceleration of the microbial degradation of mineral oils contaminating water and beaches. Selected P and N compounds in water-insoluble form are to be added to the microorganisms in the water for metabolism of hydrocarbons. Such nutrient elements, which are liberated only slowly, are supposed to promote the growth of added and of natural microorganisms. According to the results, only partial oxidative respiration is achieved in 25 days, with residual contents of from 36.62 to 65.92% of oil. This proposal too does not lead to reliable and complete microbial treatment of mineral oils.

Recently, German Patent 2,843,685 has disclosed a process for eliminating oil contamination by separating off oils or oil hydrocarbons from their solid or solid/liquid mixtures with earth, sands or residues, using microbially produced glycolipids. In this process, the glycolipid is mixed with the solid phase to give a slurry, from which the rising oil-containing phase is separated off. It is also possible to blow air into the aqueous slurry to adhere to the oil droplets and cause the oil phase to rise more rapidly.

This procedure is said to effect rapid separation of the mineral oil from the contaminated earths and sands. However, this process does not lead to microbial oxidative degradation of the mineral oil to $CO_2$ and $H_2O$ until mineralization is achieved. This process does not affect the process of the invention.

It is an object of the present invention to improve known technologies for the decontamination of soils contaminated with hydrocarbons, in such a way that the multiplication of the microorganism population in unit time takes place more rapidly and proceeds until virtually complete mineralization occurs.

It is a further object of the present invention to provide a process for rapidly accelerating the oxidative, microbial degradation of mineral oils and their products until virtually complete mineralization occurs.

We have found that this object is achieved, according to the invention, if, in addition to supplying the oxygen necessary for degradation, by aeration, soluble nutrients, water and soluble or dispersed biosurfactants as such or mixed with chemical surfactants are metered into the contaminated soils directly or into the removed contaminated soil layers, in one or more batches at time intervals, in an amount such that the formation of toxic intermediates which slow down or block microbial degradation is prevented, the accessibility of mineral oils and their products for the microorganisms is simultaneously increased and, as a result, accelerated, virtually complete mineralization by respiration of $CO_2$ and $H_2O$ is effected. The preferred weight ratio of biosurfactant to chemical surfactant is from 0.1:1 to 1:1.

Hydrocarbons which in practice contaminate soils are, for example, oil refinery products consisting of oil and chemically modified oil fractions.

The preferred biosurfactants of the present invention comprise mono-, di-, oligo-, and polysaccharides as the hydrophilic moiety and functionalized fatty acids as the hydrophobic moiety. Particularly useful biosurfactants are glycolipids of the following structure:

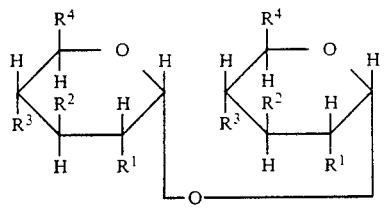

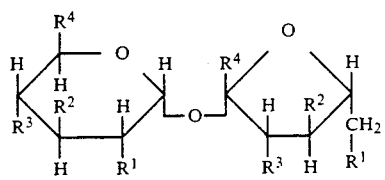

where, in formulae I and II, the glycosidic bond 1,1; 1,2; 1,3; 1,4; 1,6 in the anomeric forms $\alpha,\alpha$; $\alpha,\beta$; $\beta,\beta$ and the groups $R^1$ to $R^3$ in the positions 1, 2, 3 and 4 are in the cis or trans configuration, and $R^1$ to $R^3$ are each hydroxyl, alkoxy, alkylcarbonyloxy, alkylcarboxamido or amino and $R^4$ is hydroxymethylene, aminomethylene, alkoxymethylene, alkylcarboxamido-N-methylene, carboxyl, carboxamido, alkoxycarbonyl or N-alkylcarboxamido, and $R^1$ to $R^4$ are each one group or different groups selected from these functional groups, having $C_8$–$C_{60}$ alkyl radicals;

trehalose lipid tetraesters, in which different organic acids are linked by an ester bond to a trehalose molecule, of the formula

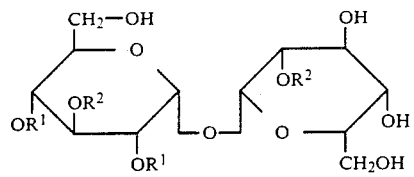

where $R^1$ is

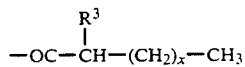

and $-OC(CH_2)_yCOOH$ and $R^2$ is

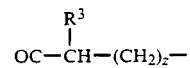

$CH_3$, where x is from 4 to 22, y is from 1 to 4 and z is from 4 to 22, and $R^3$ is H or alkyl. Other preferred biosurfactants are anionic rhamnose lipids:

2-O-α-L-rhamnopyranosyl-α-L-rhamnopyranosyl-β-hydroxy-decanoyl-β-hydroxydecanoic acid of the structural formula:

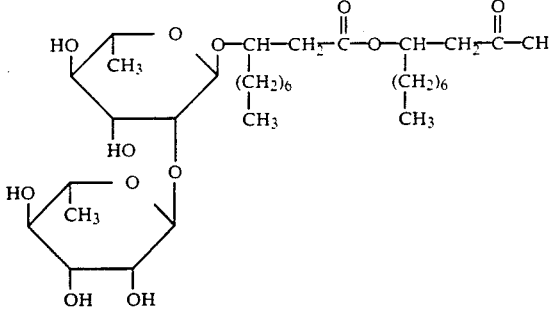

and α-L-rhamnopyranosyl-β-hydroxydecanoyl-β-hydroxydecanoic acid of the structural formula:

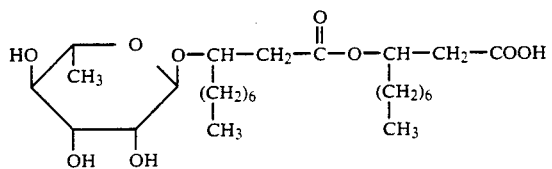

Rhamnolipids have a β-hydroxydecanoyl radical in the molecule (with a molecular weight of 334 or 480) of the structural formula:

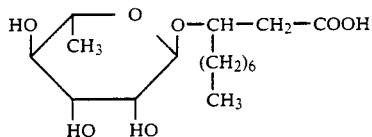

and α-L-rhamnopyranosyl-β-hydroxydecanoic acid (rhamnolipid or 2-O-α-L-rhamnopyranosyl-β-L-rhamnopyranosyl-β-hydroxydecanoic acid) of the structural formula:

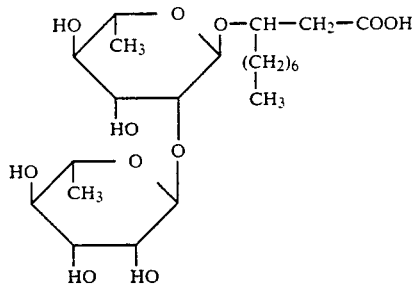

Preferred chemical surfactants are isoalkylphenyl polyethylene glycol acetate and polyoxyethylene sorbitan monooleate.

The Example below demonstrates the technical effect, as a function of time in days, until limited removal of residual oil for oil-contaminated arable soil in a reaction vessel with air supplied from below and waste air removed at the top, without agitation of the soil.

A sample of an arable soil is taken from the upper soil layer. The water content is 13.5% by weight with a maximum water capacity of 40% by weight. To carry out the experiment, the water content is brought to 33.75% by weight.

The soil is freed from stones and root residues and contaminated with 10% by weight of crude oil of the Düste Valentis type, from the Applicant's drilling operations. 100 mg of surfactants are added to this crude oil. 100 g of dry arable soil are mixed with 20 mg of a complete fertilizer. Thereafter, 10 g of the test oil/surfactant mixture are stirred into the amount of soil.

This model experiment demonstrates that, without agitation of the arable soil with supply of air and without the addition of surfactant (1), only a residual oil content of 74% is reached in 112 days. This experiment also shows that a residual oil content of 9% is reached when a nonionic surfactant (2) is added, and a residual oil content of 16% is reached with the addition of an anionic surfactant (3). This technical effect of the process of the invention is considerable. This experiment also shows that a residual oil content of 12% is achieved when a rhamnose lipid (4) is used.

These alternative and preferred biosurfactants give a residual oil content of from 9 to 16% in the same period of 112 days. However, this experiment also shows that such a technical effect is not achieved with chemical surfactants. These surfactants, (5) and (6), only give a residual oil content of 69%.

This is apparently because chemical surfactants have a certain toxic effect on the multiplication of the microorganism population.

The progress of microbial degradation can be determined by extraction of the residual oil content with solvents, or by analytical methods.

The experimental results are summarized in the Table below.

| Experiment | Time (days) | pH | Microorganism count* × $10^7$/ml | Residual oil content |
|---|---|---|---|---|
| Control without surfactant 1 | 20 | 6.6 | 50 | 91 |
| | 48 | 7.0 | 15 | 80 |
| | 70 | 6.5 | 2 | 76 |
| | 96 | 7.0 | 1 | 73 |
| | 112 | 7.3 | 2.5 | 74 |
| Addition of the nonionic THL diester 2 | 20 | 7.6 | 25 | 54 |
| | 48 | 7.2 | 2 | 31 |
| | 70 | 7.6 | 1 | 13 |
| | 96 | 7.6 | 1 | 9 |
| | 112 | 7.8 | 3 | 9 |
| Addition of the anionic trehalose tetraester 3 | 20 | 6.5 | 40 | 74 |
| | 48 | 6.9 | 20 | 57 |
| | 70 | 6.8 | 5 | 30 |
| | 96 | 5.7 | 4 | 28 |
| | 112 | 6.9 | 0.8 | 16 |
| Addition of rhamnose lipids 4 | 20 | 6.5 | 45 | 78 |
| | 48 | 6.7 | 21 | 54 |
| | 70 | 6.8 | 1 | 28 |
| | 96 | 6.8 | 10 | 19 |
| | 112 | 7.0 | 5 | 12 |

The process of the invention is also demonstrated by the Example below. This model experiment shows the technical effect of biosurfactants on the mineralization of mineral oil in the form of a model oil. Mineralization is the virtually complete oxidative degradation of mineral oils and their products by respiration to give $CO_2$ and $H_2O$ with formation of biomass.

Submerse cultivations for degradation of the model oil with the natural microorganism population of an arable soil with or without the addition of a surfactant.

All submerse cultures were cultivated in a 10 l bioreactor from Braun, Melsungen, equipped with a tumbling system. Further equipment included a pH electrode, an automatic acid/alkali titration system for keeping the pH constant, a $pO_2$ electrode for continuous measurement of the concentration of dissolved oxygen, a thermostating means with a thermometer and a rotameter for adjusting the aeration rate.

Cultivation mixture:

| | |
|---|---|
| Tap water | 8,000 ml |
| Arable soil (dry substance) | 800.0 g |
| Model oil | 80 ml |
| Surfactant (based on active substance) | 1.6 g |
| $(NH_4)_2SO_4$ | 48.0 g |
| $MgSO_4.7H_2O$ | 0.8 g |
| KCl | 0.8 g |
| $CaCl_2.2H_2O$ | 0.4 g |
| $FeCl_3.6H_2O$ | 0.2 g |

Reaction conditions:

| | |
|---|---|
| Temperature | 25° C. |
| pH | 7.3–7.6 |
| Stirring system | Tumbling system with 2 turbine stirrers |
| Speed | 450 rpm |
| Aeration rate | 3.36 liters (S.T.P.) of air per hour |
| Titration | 3N NaOH or 3N $H_2PO_4$ |

Model oil used:

| | |
|---|---|
| (89% of tetradecane + 9% of pentadecane) | 48.0% by weight |
| 1,2,4-trimethylcyclohexane | 20.0% by weight |
| 1-hexadecene | 10.0% by weight |
| 2,6,10,14-tetramethylpentadecene (Pristan) | 10.0% by weight |
| Naphthalene | 6.5% by weight |
| 1-phenyldecane | 5.5% by weight |

The Table below shows the technical effect of the biosurfactants or of the mixture with chemical surfactants in a weight ratio of 1:1 on the microbial degradation of the mineral oil hydrocarbon to give $CO_2$ and $H_2O$.

| Surfactant | | Mineralization [%] |
|---|---|---|
| Without surfactant | (0) | 11 |
| Trehalose dicorynomycolate | (1) | to 100 |
| Trehalose tetraester | (2) | 72 |
| Rhamnose lipids | (3) | 64 |

These results are achieved after a set time of only 95 hours. In this time, virtually complete mineralization is achieved with only (1). With the biosurfactants (2) and (3), the degradation rate is lower than that of (1). Thus, the time set must be increased in order to achieve virtually complete mineralization.

The model experiment makes it possible to determine the residence time to be set in a fixed-bed reactor. For the mixture of biosurfactant and chemical surfactant (5), too, this experiment indicates an acceleration of the degradation rate compared with (0) without a surfactant, the acceleration being of the same order of magnitude as that obtained with biosurfactants. On the other hand, the use of chemical surfactant (5) alone results in a substantial decrease in the degradation rate.

This technical effect of the specific action of biosurfactants as such or as a mixture with chemical surfactants in the process of the invention is surprising.

This special process in a bioreactor is also suitable as a rapid test for checking the progress of microbial degradation of earths and sands contaminated with mineral oils.

The process of the invention also provides the technical effect of acceleration of the oxidative microbial degradation until virtually complete mineralization through respiration to give $CO_2$ and $H_2O$, with formation of biomass which undergoes degradation. This surprising technical effect is attributable to the addition of nontoxic biosurfactants. The prior art failed to recognize the fact that, without the addition of biosurfactants during the oxidative microbial degradation of mineral oils, toxic intermediates form and slow down degradation or block further degradations.

The toxic intermediates found were organic acids, in particular salicylic acids, having a bacteriostatic action. These intermediates greatly inhibit the activity of the population of microorganisms in the soil.

The prior art processes therefore require a longer time for the degradation of the mineral oil or its products in soils. These prior art processes can therefore be improved by adding biosurfactants according to the process of the invention.

An investigation has been carried out to determine whether the process of the invention with biosurfactants or with chemical surfactants gives rise to bacteriostatic compounds which inhibit or block degradation.

The Table below shows the formation of salicylic acid as an inhibitor in the oxidation of the model oil as a function of time for the surfactants of the mineralization experiment.

| Surfactant | | Salicylic acid | |
|---|---|---|---|
| | | 20 h | 50 h |
| Without surfactant | (0) | + + | + + |
| Trehalose dicorynomycolate | (1) | − | − |
| Trehalose tetraester | (2) | − | − |
| Rhamnose lipids | (3) | − | − |

+ + = 50 mg of salicylic acid per liter

The result obtained was that, without the addition of surfactants, a pronounced inhibiting effect occurs.

It is also found that, by adding biosurfactants according to the process of the invention, the inhibiting substance salicylic acid is not formed. The process of the invention thus permits the microbial oxidative degradation of the model oil, as typical of mineral oils, to be accelerated compared with the prior art.

The microorganisms held in the soil are degraded in the course of time and no longer constitute any danger for soil and subsoil.

The process of the invention has the technical advantage of improved decontamination, in an optimum short time, of soils contaminated with hydrocarbons, until mineralization occurs.

The process of the invention also has the advantage that, as a result of the virtually complete decontamination of the soils, the latter can be left at the site of contamination, avoiding dumping in the form of special wastes.

We claim:

1. In a process for the decontamination of soils contaminated with hydrocarbon which process consists essentially of aerating the soil with oxygen necessary for degradation of the hydrocarbon, adding water and surfactants, whereby the hydrocarbon is converted to carbon dioxide and water, the improvement wherein the surfactant comprises a biosurfactant.

2. The process of claim 1 wherein the surfactant comprises a mixture of (a) a biosurfactant and (b) a synthetically produced chemical surfactant in a weight ratio of from 0.1:1 to 1:1.

3. The process of claim 1 wherein the biosurfactant comprises a hydrophilic moiety containing at least one saccharide and a hydrophobic moiety containing at least one functionalized fatty acid.

4. The process of claim 3 wherein the biosurfactant is a member selected from the group consisting of trehalose dicorynomycolate, trehalose lipid triesters, and rhamnose lipids.

5. The process of claim 1, wherein the biosurfactant is (a) at least one glycolipid having the structural formula:

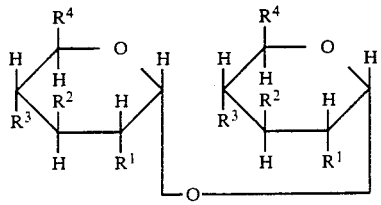

(I)

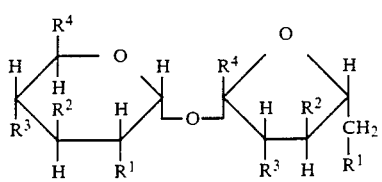

(II)

wherein, in formulae I and II, the glycosidic bond 1,1; 1,2; 1,3; 1,4; 1,6 in the anomeric forms $\alpha,\alpha$; $a,\beta$; $\beta, \beta$ and the groups $R^1$ to $R^3$ in the positions 1, 2, 3 and 4 are in the cis or trans configuration, and $R^1$ to $R^3$ are each hydroxyl, alkoxy, alkylcarbonyloxy, alkylcarboxamido or amino and $R^4$ is hydroxymethylene, aminomethylene, alkoxymethylene, alkylcarboxamido-N-methylene, carboxyl, carboxamido, alkoxycarbonyl or N-alkylcarboxamido, and in $R^1$ to $R^4$ the alkyl groups are the same or different and contain 8 to 60 carbon atoms or (b) a trehalose lipid tetraester of the formula

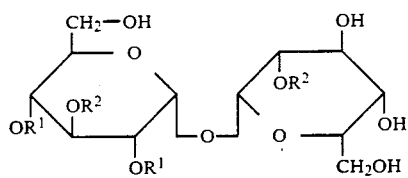

where $R^1$ is

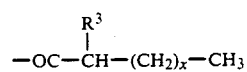

or $-OC(CH_2)_y COOH$ and $R^2$ is

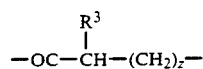

$CH_3$, where x is from 4 to 22, y is from 1 to 4 and z is from 4 to 22, and $R^3$ is H or alkyl.

6. The process of claim 1, wherein the biosurfactant is selected from the group consisting of (a) an anionic rhamnose lipid, 2-O-$\alpha$-L-rhamnopyranosyl-$\alpha$-L-rhamnopyranosyl-$\beta$-hydroxydecanoyl-$\beta$-hydroxydecanoic acid of the structural formula:

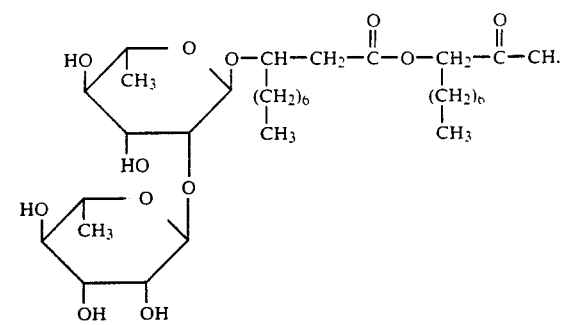

(b) an $\alpha$-L-rhamnopyranosyl-$\beta$-hydroxydecanoyl-$\beta$-hydroxydecanoic acid of the structural formula:

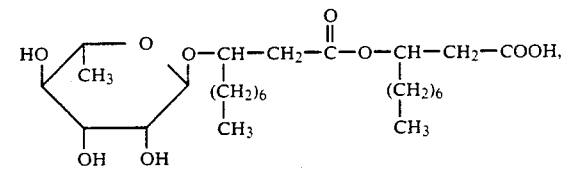

(c) a rhamnolipid having a $\beta$-hydroxydecanoyl radical in the molecule (with a molecular weight of 334 or 480) of the structural formula:

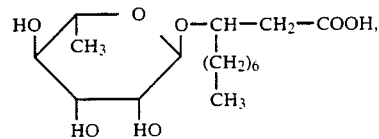

and (d) an $\beta$-L-rhamnopyranosyl-$\beta$-hydroxydecanoic acid (rhamnolipid or 2-O-$\alpha$-L-rhamnopyranosyl-$\beta$-L-rhamnopyranosyl-$\beta$-hydroxydecanoic acid) of the structural formula:

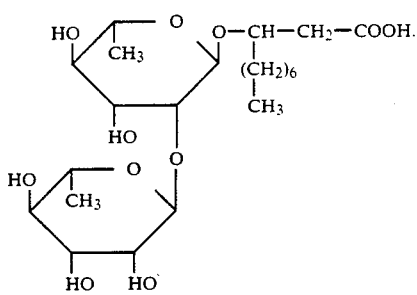

7. The process of claim 1 wherein the contaminated soil is additionally treated with at least one bacterial nutrient which is a water-soluble salt of a compound selected from the group consisting of Na, K, Ca, Mg and Fe.

8. The process of claim 7 wherein the salt is $(NH_4)SO_4$, $MgSO_4.7H_2O$, KCl, $CaCl_2.2H_2O$, $CaCl_2.6H_2O$ or $FeCl_3.6H_2O$.

9. The process of claim 1 wherein contaminated soil layers are removed, introduced into at least one reactor and fluidized therein with water, with the addition of nutrients, at a constant temperature in the range from 10° to 40° C. and at pH of from 4 to 8 and with the addition of a surfactant which comprises an anionic or nonionic biosurfactant, with aeration of the contaminated soil layers with the natural microorganism population present therein, for rapid microbial oxidation of the hydrocarbons with formation of $CO_2$ and an aqueous solution to form a mixture of a solid phase and a liquid phase which contains hydrocarbon-free solid and a biomass, separating the mixture containing the solid phase and the liquid phase from the aqueous solution and removing the aqueous solution.

10. The process of claim 9 wherein the surfactant comprises a mixture of a nonionic or anionic biosurfactant and a synthetically produced chemical surfactant.

11. The process of claim 9, wherein the aeration rate is from 0.05 to 1.0 liters (S.T.P.) of air per liter of reactor volume per minute.

12. The process of claim 9 wherein the conversion is carried out in a continuous procedure.

13. The process of claim 9 wherein a plurality of reactors is used and at least one reactor is a mechanically stirred reactor and at least one reactor is a hydrodynamic reactor.

14. The process of claim 1, wherein comminuted bark is additionally added.

15. The process of claim 14 wherein the bark is pine bark.

16. The process of claim 1 wherein from 0.5 to 20 g of biosurfactant is added per kg of hydrocarbon.

17. The process of claim 1, wherein the decontamination of the soil is carried out in situ by a procedure in which compressed air in combination with surfactant composition containing at least one of a nonionic biosurfactant is sprayed as a dispersion into the contamination soil through a flexible pipeline system, which pipeline has orifices arranged at intervals, whereby the natural microorganism population present in the soil is enhanced and microbial oxidation of the hydrocarbon to $CO_2$ and $H_2O$ is accelerated.

18. The process of claim 17 wherein the surfactant composition further contains a synthetically produced chemical surfactant.

* * * * *

UNITED STATES PATENT AND TRADEMARK OFFICE
CERTIFICATE OF CORRECTION

PATENT NO. : 5,128,262
DATED : July 7, 1992
INVENTOR(S) : Walter LINDOERFER et al.

It is certified that error appears in the above-identified patent and that said Letters Patent is hereby corrected as shown below:

On the Title page, item [57], Abstract, line 11, delete "in" and insert --is--.

Claim 5, column 9, line 63, after "$(CH_2)_z$-" insert -- $CH_3$ --

Claim 5, column 9, line 65, delete "$CH_3$"

Claim 6, column 10, line 40, delete "$\beta$" first occurrence, and insert -- $\alpha$ --

Signed and Sealed this

Tenth Day of August, 1993

Attest:

MICHAEL K. KIRK

Attesting Officer    Acting Commissioner of Patents and Trademarks